Feb. 16, 1954
S. A. RASMUSSEN
2,669,433
SAFETY FENCE FOR MOTOR ROADS
Filed July 24, 1952
2 Sheets-Sheet 1
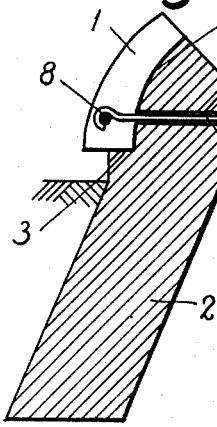
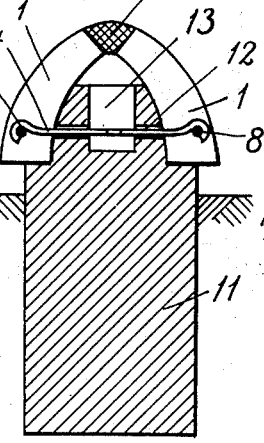
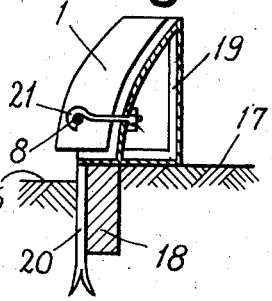
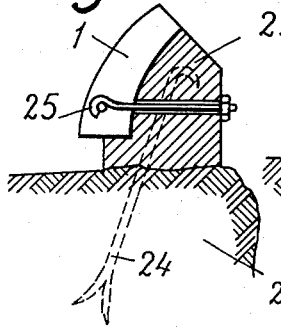
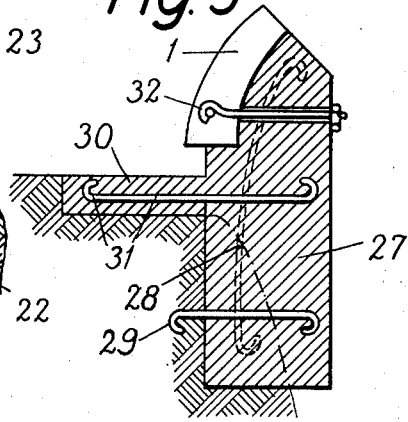
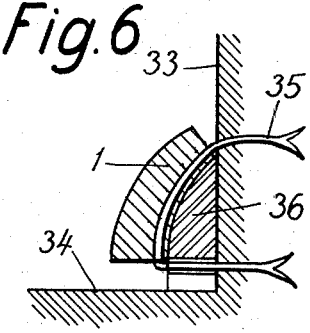
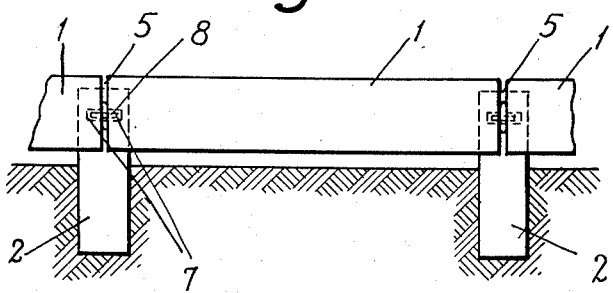
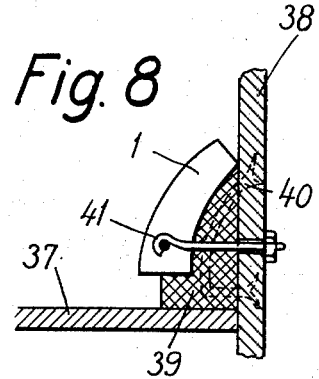
INVENTOR.
Svend Aage Rasmussen
BY
Mason, Fenwick & Lawrence
Attorneys Feb. 16, 1954 S. A. RASMUSSEN 2,669,433
SAFETY FENCE FOR MOTOR ROADS
Filed July 24, 1952 2 Sheets-Sheet 2

INVENTOR.
*Svend Aage Rasmussen*
BY
*Mason, Fenwick & Lawrence*
Attorneys

Patented Feb. 16, 1954

2,669,433

UNITED STATES PATENT OFFICE 2,669,433

SAFETY FENCE FOR MOTOR ROADS

Svend Aage Rasmussen, Silkeborg, Denmark

Application July 24, 1952, Serial No. 300,601

7 Claims. (Cl. 256—13.1)

This invention relates to safety fences for motor roads and, more particularly, new and improved methods of assembling and mounting such fences at various locations.

Another object of the invention is to provide such assembly means that the safety fence may be readily assembled and its individual sections easily replaced, in case any part of the fence should become damaged.

It is a further object of the invention to provide installation members by means of which the fence may be mounted at different locations, e. g. at bridges and similar steel structures or reinforced concrete structures as well as on rocky ground or in tunnels.

The invention will be further described hereinafter with reference to the drawings, which show various embodiments of installation members:

Figure 1 is a section of a supporting post for an ordinary safety fence for mounting at one side of a motor road.

Figure 2 is a section of a supporting post for a double-sided safety fence to be mounted between two traffic lanes.

Figure 3 is a section of a supporting frame for mounting along a curbstone.

Figure 4 is a section of a supporting post mounted on a rock.

Figure 5 is a section of a supporting post mounted on the edge of a mountain slope.

Figure 6 shows fixing means for mounting the safety fence in a tunnel.

Figure 7 is an ordinary safety fence according to Figure 1, viewed from the side.

Figure 8 shows installation members for mounting the fence on a bridgeway structure.

Figure 9:
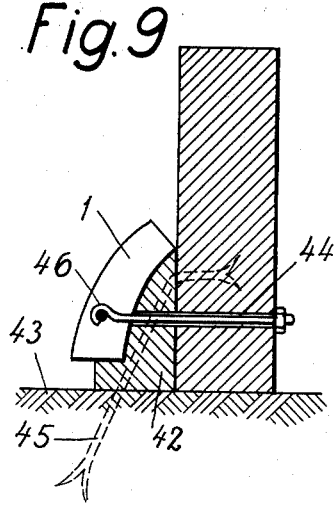
Figure 9 is a section of a supporting post mounted against a wall.

The safety fence is composed of longitudinal guard plates 1 mounted, as shown in Figure 7, on supporting posts 2 of reinforced concrete that may be dug into the ground. The posts 2 are provided with a recess having a horizontal supporting surface 3 and an inclined arched surface 4 conforming in shape to the back of the plate or rail 1. The rails are mounted on the posts as indicated in Figures 1 and 7, leaving a space 5 between the guard rails off the center line of the said posts.

Each supporting post has a through-going hole 6 at right angles to the longitudinal direction of the fence, and each end of the guard rails is provided with an axial hole 7, preferably conical, so that its maximum diameter is at the end surface of the guard plates. In the holes 7 of two abutting guard plates there is a pin 8 which is engaged by the open eye of a bolt 9 extending through the hole 6. On to the bolt and projecting on the back of the post there is screwed a nut 10.

The safety fence is assembled in the following manner:

A guard rail plate 1 is mounted in the recess or depression of two supporting posts with its end surfaces close to the center line of the posts. A bolt 9 is then placed in the hole 6 and a pin 8 is passed through the eye of the bolt and into the hole 7.

Subsequently, the next guard rail plate 1 is mounted and moved in axial direction towards the plate already mounted, so that the pin 8 is passed into the hole 7. There will thus be a space between the end surfaces of the two plates conforming to the thickness of the bolt 9 which is then provided with a nut 10 which is tightened, and the two adjoining plates are thus fixed to the post. Between the surface 4 and the plate 1 and in the joint between the end surfaces of the plates mortar is filled in so as to provide tightness.

In the case of replacement of one or more guard rail plates owing to damage, the nut 10 is unscrewed, and the bolt 9 may be struck forwardly, the pin 8 passing the open eye of the bolt. When the bolt 9 has been removed, the plates may be drawn in the direction towards the traffic lane, as the space between the end surfaces of the plates as well as the clearance in the holes 7 permit of this operation.

The safety fence illustrated in Figure 2 consists of supporting posts 11 provided with two recesses in which there are mounted plates 1 facing in opposite directions so that they may serve to separate two traffic lanes. The post 11 is provided with a hole 12 extending from one recess to the other and being of longitudinal cross-section in horizontal direction. Furthermore, the said post has an axial hole 13 of comparatively large cross section in proportion to the hole 12. Through the hole 12 is passed a bolt 14 having an open eye in either end and which may be mounted in such manner that the position of the eyes is horizontal.

When the bolt 14 has been brought in position, it is turned 90 degrees around its longitudinal axis, and pins 8 are inserted in the holes 7 in the end surfaces of the plates 1. The said pins extend through the eyes of the bolt 14. The plates 1 are fastened to the post 11 by introducing a tool into the hole 13, by means of which the bolt 14 is bent so that its two extreme points are pulled towards each other, whereby the tension through the bolts 8 is transmitted to the plates 1, thus fastening the said plates. Between the upper surfaces of the two plates mortar 15 is filled in so as to provide tightness.

Referring to Figure 3, 16 denotes a traffic lane and 17 a sidewalk, whereas 18 is a curbstone. The safety fence to be mounted along the said curbstone consists like the fences disclosed in the foregoing of guard rail plates 1 mounted on supporting members. These are in this case constituted by brackets 19 made of sectional iron of T-shaped cross-section, and on to each bracket there is welded a reinforcing iron 20 fixed to the traffic lane by casting. The plates 1 are fixed to the brackets 19 by means of bolts 21 engaging pins 8 as disclosed in the foregoing.

Figure 4 shows a safety fence mounted on a rock 22 and consisting of guard rail plates 1 resting in depressions of supporting posts 23. The said posts are placed direct on the rock, being cast in situ and secured to the rock by means of an anchor iron 24. The plates 1 are fixed to the posts 23 by means of bolts 25 in the disclosed manner.

In Figure 5 is shown a safety fence mounted on a rock 26 by means of posts 27 which are cast in situ and mounted on a mountain slope. The posts are secured to the rock by means of anchor irons 28 and 29. Each post is provided with a member 30 projecting into the road metal and connected with the post by means of an anchor iron 31. The plates 1 are attached to the posts 27 by means of bolts 32 in the disclosed manner.

In Figure 6, 33 denotes the wall of a tunnel, 34 being the traffic lane. The guard rail plates 1 are attached directly to the mountain wall by means of reinforcing irons 35, intermediary members 36 being placed between the plates and the wall.

Figure 8 shows a safety fence installed on a bridgeway structure. The traffic lane is denoted by 37, and a plurality of vertical supporting posts in the bridgeway structure are denoted by 38. The plates 1 are mounted on supporting members 39 attached to the posts 38 by means of anchor irons 40. The plates 1 are attached to the posts 38 by means of bolts 41 in the manner disclosed in the foregoing.

The guard rail plates 1 shown in Figure 9 are mounted on supporting members 42 secured to the traffic lane 43 and a concrete wall 44 by means of anchor irons 45. The plates are attached in usual manner by means of bolts 46.

Figure 10:
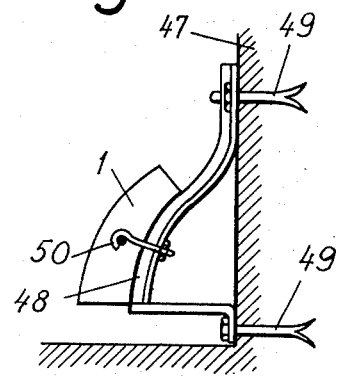
Figure 10 shows installation members for mounting the safety fence against a wall.

Figure 10 illustrates another method of attaching the safety fence to a wall 47. The plates 1 are mounted on brackets 48 of sectional iron, preferably of T-shaped cross-section, one flange of which is located between the end surfaces of the plates 1. The brackets are attached to the wall 47 by means of anchor irons 49, and the plates 1 are attached to the brackets 48 by means of bolts 50 in the previously described manner.

Figure 11:
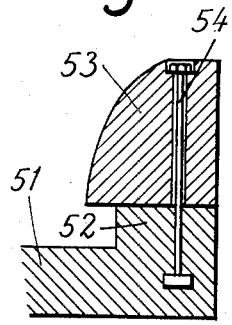
Figure 11 shows a special embodiment of a safety fence mounted on a concrete structure.

Figure 11 shows the installation of a safety fence on a bridgeway structure. Along its edge a traffic lane 51 is provided with a low wall 52 on which is mounted a safety fence 53 carried directly by the wall 52 and attached by means of vertical bolts 54.

Figure 12:
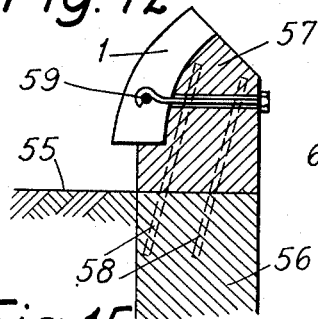
Figure 12 is a section of a supporting post mounted on a concrete wall.

Figure 12 shows the mounting of a safety fence on a reinforced concrete structure, for example a bridge. Beside the traffic lane 55 there is provided a concrete girder 56 directly on which there are mounted supporting members 57 attached by means of anchor irons 58. The plates 1 are attached in usual manner by means of bolts 59.

Figure 13:
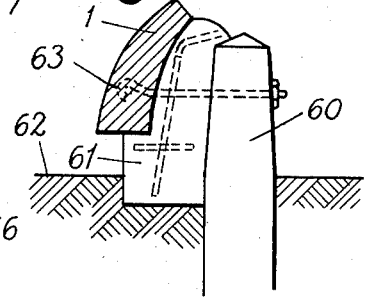
Figure 13 is a section of a safety fence mounted on existing posts.

In Figure 13 is illustrated the attachment of a safety fence to supporting posts 60 mounted along a traffic lane and originally intended for other purposes. In front of the said posts are mounted intermediary members 61 countersunk in the lane 62 and having a depression in which the plates 1 are mounted as previously described and attached by means of bolts 63 which extend through the intermediary member 61 and the post 60.

Figure 14:
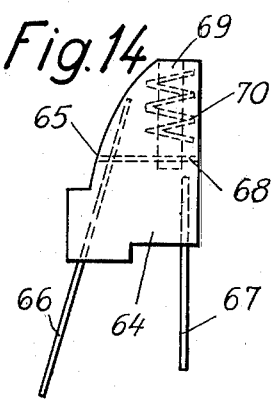
Figure 14 shows a supporting post for installation on a bridgeway structure.

Figure 14 shows a supporting member 64 for attachment on a bridgeway structure and having a depression 65 to accommodate the plates 1. The supporting member is provided with anchor irons 66 and 67 and a hole 68 for fixing bolts. The upper end of the supporting member has a vertical hole 69 surrounded by reinforcing iron 70. The hole 69 is adapted for installation of a fence.

Figure 15:
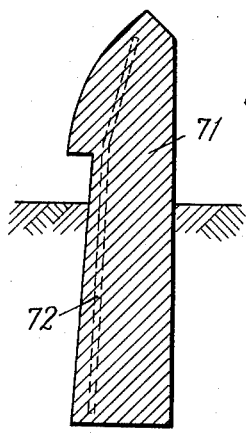
Figures 15 and 16 show a special embodiment for a safety fence.
Figure 16:
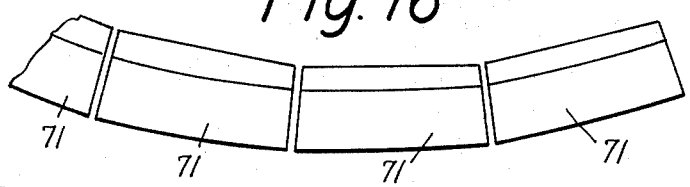

Figures 15 and 16 show a safety fence composed of elements 71 placed beside each other in the ground. These elements, which constitute both the guard rail plates and the supporting members of the fence, are provided with reinforcing irons 72 and are more particularly suitable for mounting in sharp road bends since they are comparatively short or, alternatively, may be cast in a curved shape.

Figure 17:
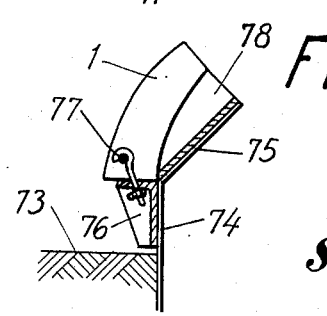
Figure 17 shows installation means for attachment of a safety fence on a steel structure.

In Figure 17 is shown a traffic lane 73 on a steel structure, for example a bridge, with a plurality of vertical posts 74 with inclined girders 75. The plates 1 of the safety fence are mounted on brackets 76 that are riveted or welded to the posts 74, and the plates are attached to the brackets 76 by means of bolts 77 in the manner previously described. Between the plates 1 and the inclined girders 75 are mounted intermediary pieces 78.

By curved safety fences which consist of curved plate sections mounted on supporting posts it can be helpful in order to main the curvature of the fence against deformation and damage to provide a wire which runs through holes in some of the posts or all the posts and thereby connects the post and increases the resistance of the fence.

What I claim and desire to secure by Letters Patent is:

1. A safety fence for roads comprising, spaced supporting members each having a through hole opening in the front face of the support medial to the side edges thereof, guard plates of slightly less length than the distance between centers of said supports mounted upon said supports in longitudinal alignment with adjacent edges of adjacent plates lying on opposite sides of said openings and spaced apart by at least the width of said openings, matching and confronting openings in adjacent edges of adjacent plates, dowel pins in the openings in said plates bridging the space between adjacent plates, hooks engageable over said dowels and having shanks extending through the openings in said supports, and means to tension the shanks of said hooks longitudinally away from said dowels.

2. In a safety fence as claimed in claim 1, said openings in the side edges of said plates being outwardly diverging.

3. In a safety fence as claimed in claim 1, said means to tension said shanks comprising nuts threaded on said shanks.

4. In a safety fence as claimed in claim 1 said openings in the side edges of said plates diverging outwardly, and said means to tension said shanks comprising nuts threaded on said shanks.

5. In a safety fence as claimed in claim 1, said supports having horizontal shoulders on their faces, and said plates seating on said shoulders.

6. In a safety fence for roads comprising, spaced supporting members each having a through horizontal hole opening in opposite faces medial to the side edges thereof, guard plates of slightly less length than the distance between centers of said supports mounted upon opposite sides of said supports in longitudinal alignment with adjacent edges of adjacent plates spaced apart on opposite sides of said horizontal hole, adjacent edges of adjacent plates having matching and confronting openings, dowels in said openings bridging the space between plates, a tie member in the hole in said support having hooks at its ends engaging over the dowels, and means to tension the tie member to draw said plates into tight engagement with said supports.

7. In a safety fence as claimed in claim 6, said openings in the side edges of said plates diverging outwardly.

SVEND AAGE RASMUSSEN.

References Cited in the file of this patent

UNITED STATES PATENTS

| Number | Name | Date |
| --- | --- | --- |
| 2,149,548 | Rasmussen | Mar. 7, 1939 |